United States Patent [19]
Seifert

[11] Patent Number: 5,287,774
[45] Date of Patent: Feb. 22, 1994

[54] METHOD AND DEVICE FOR PRODUCING SEAMLESS RIBBON AND WIRE LOOPS, AND THEIR USE AS CUTTINGS TOOLS IN RIBBON AND WIRE SAWS

[75] Inventor: Dieter Seifert, Neuotting, Fed. Rep. of Germany

[73] Assignee: Wacker-Chemitronic Gesellschaft fur Elektronik-Grundstoffe mbH, Burghausen, Fed. Rep. of Germany

[21] Appl. No.: 875,073

[22] Filed: Apr. 28, 1992

[30] Foreign Application Priority Data

Jul. 12, 1991 [DE] Fed. Rep. of Germany ........ 4123095

[51] Int. Cl.$^5$ ............................ B23D 65/00; B21B 5/00
[52] U.S. Cl. ................................... 76/112; 76/DIG. 12
[58] Field of Search ............. 76/112, DIG. 12; 72/70, 72/111, 205

[56] References Cited

U.S. PATENT DOCUMENTS 2,029,751  4/1936  Adams .
4,176,538 12/1979  Kymmell et al. ..................... 72/111

FOREIGN PATENT DOCUMENTS 201166  12/1905  Fed. Rep. of Germany .
372377  10/1920  Fed. Rep. of Germany .
0132206  6/1986  Japan ........................................ 72/111
0048603  9/1988  Japan ........................................ 72/111
8500765  2/1985  PCT Int'l Appl. .
8701186 11/1985  PCT Int'l Appl. .
2055643  3/1981  United Kingdom .

OTHER PUBLICATIONS

"Das Fachwissen des Ingenieurs", vol. I/2, VEB Fachbuchverlag, Leipzig, 204–206 (1965).

*Primary Examiner*—Roscoe V. Parker
*Attorney, Agent, or Firm*—Burgess, Ryan & Wayne

[57] ABSTRACT

The precise cutting of thin wafers from blocks or rods of hard and brittle material by means of ribbon or wire saws requires a very high strength of the sawing ribbon material or sawing wire material. In the method according to the invention, seamless metal rings are cold-rolled to form ribbon loops, optionally divided to form narrower ribbon loops or to form wire loops and optionally provided with a cutting coating. In this way, extremely strong cutting tools can be obtained.

8 Claims, 2 Drawing Sheets

METHOD AND DEVICE FOR PRODUCING SEAMLESS RIBBON AND WIRE LOOPS, AND THEIR USE AS CUTTINGS TOOLS IN RIBBON AND WIRE SAWS

FIELD OF THE INVENTION

The invention relates to a method for producing seamless ribbon and wire loops having a constant strength over their entire circumference and a high shape precision. Furthermore, the invention relates to a device for producing such ribbon and wire loops, and to their use as cutting tools in ribbon and wire saws.

BACKGROUND OF THE INVENTION

The requirements imposed on sawing tools are particularly high, for example, in semiconductor technology. In this field, brittle and hard workpieces, for example rods or blocks of semiconductor materials such as silicon or of compound semiconductor materials such as gallium arsenide, are sawn into thin wafers. The wafers having a thickness of 0.1 mm to 1 mm are used as starting products for producing a wide variety of electronic components or, alternatively, for producing solar cells.

A low cutting loss and a high geometrical quality of the sawn-off wafers, associated with high sawing rates, are the most important requirements to be fulfilled for an economical sawing process.

Annular saws, wire saws and ribbon saws are the most frequently used sawing machines when it is a matter of cutting brittle and hard workpieces with high precision. Hitherto, annular saws, in particular, have been used to saw rods of silicon single crystals into wafers. However, the saw blades of annular saws are no longer able to follow the unbroken trend toward single crystals with ever larger diameters—the technology has now mastered the pulling of crystals having diameters of 300 mm in the required quality—without disadvantages. It is only by means of an increase in thickness that fairly large saw blades can be stabilized in such a way that wafers having the required geometrical quality are obtained. With the unavoidably wider cutting edges, higher cutting losses have to be accepted. The cost effectiveness of wafer production is critically impaired particularly if the lost material is expensively produced, high-quality semiconductor material. A further disadvantage arises for the sawing process out of the cost of designing the machine and the sawing tool which increases with the workpiece diameter.

Wire and ribbon saws with fixed grinding grain form an alternative to annular saws, particularly for workpieces having large diameters. For smaller workpieces, it is also possible to use wire saws with loose lapping grain, the wire being repeatedly coiled around deflection rollers so that a large number of wafers can be produced at the same time. As the length of the cutting slit increases, however, problems increasingly arise which relate to the conveyance of lapping grain to the cutting point. The achievable cut accuracy is also thereby limited. Ribbon saw blades for sawing hard and brittle material are, as a rule, provided along one edge with cutting platelets or continuously with a cutting coating out of which the fixed diamond or boron nitride cutting grains project. The ribbons are welded at their ends to form ribbon loops. Such ribbon loops are fed in a circle over deflection rollers. The feed movement of the workpiece towards the cutting edge takes place perpendicularly to the direction of movement of the ribbon.

The rotational speeds of wire or ribbon loops with fixed cutting grains reach, depending on the material, appreciable values. In sawing hard and brittle semiconductor materials, such as for example silicon, these are preferably between 20 m/s and 120 m/s. Since extreme trueness of cutting line is required of the cutting tools, the loops have to be tensioned with a high tensile force in order that the lateral deflection of the saw blade as a consequence of the effect of the sawing forces remains in a tolerance range of a few Mm. In addition, owing to the constant change in direction during rotation, a high flexural fatigue strength of the loop material is necessary. Particularly suitable materials for saw ribbons and wires are steels and special alloys because of their high tensile strength and elastic limits. However, it has hitherto not been possible to make optimum use of the beneficial material properties. The weak points of wire and ribbon loops are formed by the seams at which the wire or ribbon ends have been welded or soldered to form loops. Allowance has to be made for the lower strength of the seam point by adjusting the ribbon tension. If, as in the case of machining silicon, cutting with the required quality is only possible with high tensile loading of the sawing tool, the ribbon cross section and wire diameter have to be increased correspondingly. In addition, seam stresses are produced which additionally impair the flatness and the concentric running of the ribbon loops and adversely affect the precision of the cuts.

GB 2,055,643 A discloses the fact that a seamless ribbon can be produced from a flat, thin disk by stretching the inner regions. This method is, however, usable only to a limited extent as a result of the size of the available disk material and results in ribbons having a very nonuniform degree of deformation and varying stress and strength distribution.

An object of the invention is therefore to provide a method for producing precise ribbon and wire loops of any required size and with a high-load carrying capacity which have as constant as possible a strength their entire circumference. A further object of the invention is to provide a device for producing such ribbon and wire loops.

SUMMARY OF THE INVENTION

These objects are achieved by the method according to the invention for producing seamless ribbon and wire loops, which comprises
 a) preparing a seamless metal ring,
 b) converting the metal ring into a rollable starting ring,
 c) expanding the starting ring by cold rolling to form a thin ribbon loop,
 d) optionally dividing the ribbon loop into narrower ribbon or wire loops,
 e) optionally applying a cutting coating to the ribbon or wire loops.

These objects are furthermore achieved by a device for cold rolling seamless metal rings to form seamless ribbon loops, comprising a system of working, auxiliary and supporting rolls built into a machine frame, wherein the rolling forces are outwardly borne by the machine frame via the returning part of the ribbon loop.

As a result of rolling processes, for example, steel materials in strip or sheet form can be formed into very thin, dimensionally precise ribbons or foils. The rolling work is, as a rule, distributed over a plurality of roll stands which the material passes through in succession. Particularly in the case of cold rolling, ie. in the case of material machining by rolling without heat input, a particular hardening of the material occurs in addition to the deformation. Use is made of this effect in engineering, inter alia, for producing spring steel ribbons with high load-carrying capacity. Steel ribbons produced by this method have tensile strengths of up to 2200 N/mm$^2$. Special alloys may achieve still higher values.

As a result of the method according to the invention, seamless ribbon loops having these beneficial material properties become available. From an annular seamless metal blank, a rollable starting ring is first manufactured and the latter is then cold-rolled into a thin ribbon loop using the device according to the invention. In the subsequent aftertreatment steps, the ribbon loop is optionally divided into narrower ribbon or wire loops. These are then optionally provided with a cutting coating.

BRIEF DESCRIPTION OF THE DRAWINGS

The production method according to the invention is explained in greater detail below by reference to figures.

DETAILED DESCRIPTION OF THE INVENTION

The blanks are produced from parent bodies by cutting or non-cutting measures. In particular, rings cut from seamless metal tubes, cut out of metal sheets or produced from drilled cylindrical parent bodies are suitable. Obviously, the blanks may also be cast. Under some circumstances, it is expedient first to expand the internal ring diameter by the hot-rolling method or by forging. The choice of substance is independent of weldability and can in principle be extended to all rollable materials. However, steels which are also used to produce springs and other materials which reach a high strength after rolling are found to be particularly advantageous.

Figure 1A:
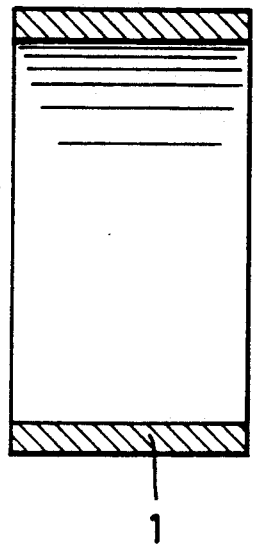
FIGS. 1a–d) diagrammatically show the progress of the treatment of a blank to form a rollable starting ring.
Figure 1B:
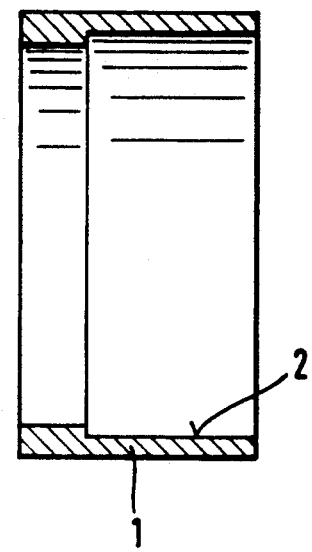
Figure 1C:
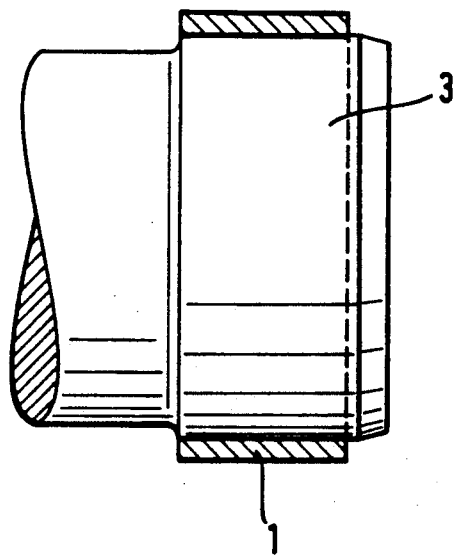
Figure 1D:
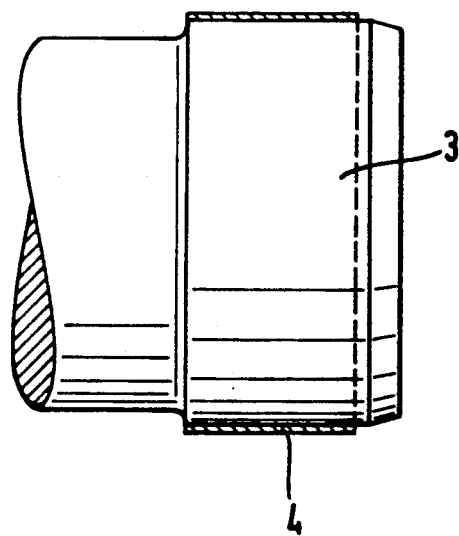

The pretreatment of the blank to form the starting ring largely predetermines the geometry of the ribbon loop to be produced. During the rolling operation, the ring circumference of the starting ring is primarily increased and the wall thickness correspondingly decreased. The wall thickness $h_0$ of the starting ring depends therefore approximately on the desired thickness $h_1$ of the rolled ribbon. As a first approximation it can be determined using the formula $$h_0 = h_1 \cdot U_1 / (D_o \cdot \pi),$$

where $U_1$ is the desired circumference of the loop and $D_o$ is the mean ring diameter of the starting ring. If, for example, a ribbon having a thickness of 0.05 Mm and a circumference of 3000 mm is to be rolled from a ring having a mean diameter of 100 mm, the blank has to be converted into a starting ring having a wall thickness of approximately 0.48 mm. According to the diagram in FIG. 1a) and FIG. 1b), the internal diameter of the annular blank (1) is expanded, for example, by grinding to form a cylindrical seat (2) over a width greater than the desired ribbon loop width. In the subsequent machining step, this ring section is cut away from the remainder and, as shown in FIG. 1c), drawn on to an exactly fitting mandrel (3). Obviously, it is also possible to use the mandrel first and then to remove the remaining piece. In the subsequent machining step, sufficient material is removed from the external wall surface, for example, by turning and grinding for the rollable starting ring (4) with the calculated wall thickness to result. This stage is indicated in FIG. 1d). The diameter of the starting ring can be freely chosen within wide limits. The ring width essentially depends on the application for which the ribbon loop being produced is provided and in the event of use in ribbon or wire sawing, on the number of subloops into which the loop is to be divided. However, it must be ensured that very wide rings can still be precisely rolled. With particular advantage, starting rings having widths of 5 Mm to 400 Mm are produced further. As shown above, the other dimensions of the starting ring are decisively based on the circumference and the ribbon thickness of the ribbon loop to be produced. Preferably, with a view to a future use of the ribbon loop in ribbon or wire saws, diameters of 50 mm to 500 Mm, which are rolled to a ribbon loop circumference of preferably 1 m to 6 m are suitable for the starting rings. The thickness of the rolled loops is preferably 0.01 Mm to 1.5 Mm.

The expansion of the starting ring to form a ribbon loop is carried out in a cold-rolling system. The rolling may, however, be interrupted by heat-treatment steps in order to inhibit an unduly high brittleness.

Figure 2:
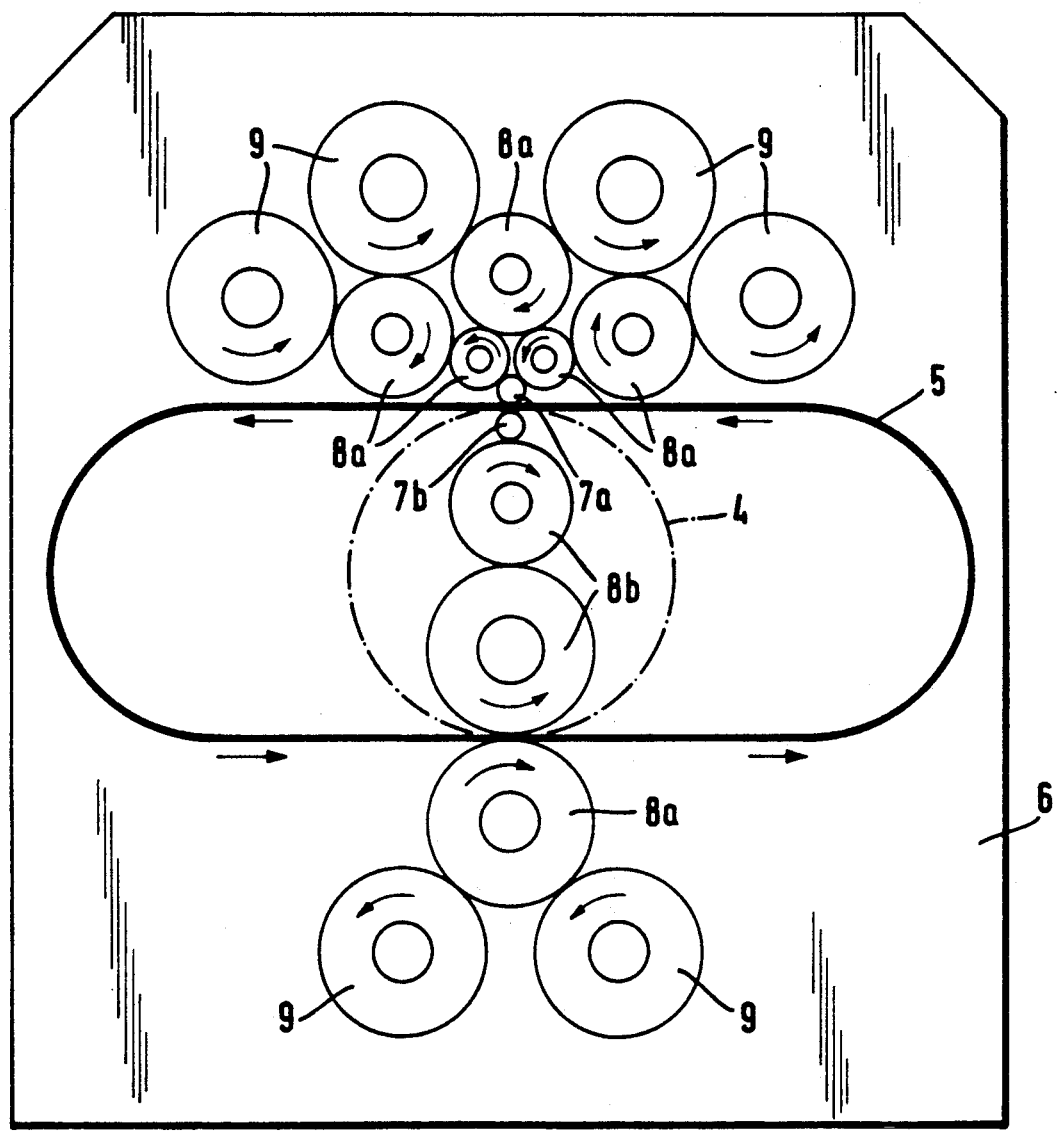
FIG. 2 shows, in a schematic drawing, a possible embodiment of a cold-rolling mill in which the metal ring is expanded to form the seamless ribbon loop.

Cold ribbon-rolling mills have hitherto been known only for producing thin metal foils or metal strips and have been described, for example, in "DAS FACHWISSEN DES INGENIEURS", volume I/2, VEB Fachbuchverlag, Leipzig, 204–206 (1965). The rolling device according to the invention is specifically suitable for producing ribbon loops. FIG. 2 shows the starting ring (4) and the expanding ribbon loop (5) in the rolling device. The roll arrangement in the machine frame (6) is shown in the form which is standard in rolling technology. The rolling operation and the cold hardening of the workpiece associated with it takes place between two oppositely situated thin working rolls (7a, 7b) made, in general, of smooth hardened steel. They form a nip through which the metal loop is pulled or through which it is forced as a consequence of a rotary movement of the rolls. Resting against the working rolls (7a, 7b) are auxiliary rolls (8a, 8b) having larger diameter. Some of them are driven and transmit the movement to the adjacent rolls. In order to be able to roll the ribbon loop with higher precision, the working roll (7b) situated in the interior of the ribbon loop is borne with the aid of auxiliary rolls (8b) by supporting rolls (9) mounted in the frame (6) via the ribbon loop. The external working roll (7a) is preferably surrounded by a total of five auxiliary rolls (8a). Of these, two rest contiguously against the working roll, the other three form a further set of surrounding rolls. The feed movement of the working rolls, that is to say the reduction of the nip width is preferably possible as a result of a change in position of the external supporting rolls (9). In addition, these rolls, constructed with still greater diameter restrict whipping of the thinner rolls during the transmission of the rolling forces to the workpiece. Preferably,, the supporting rolls associated with the upper working roll are used for the feed movement. It is specifically for the machining of the ribbon loop that the supporting rolls of the lower working roll are arranged in the form of a Y rotated through 180° as shown. The use of a plurality of sets of supporting rolls makes it possible to use working rolls having smaller diameters, for example of 4 mm, so that even high-strength materials can be rolled.

Obviously, other roll arrangements are also possible. It is particularly advantageous, however, if the rolling forces are outwardly borne on the rigid machine frame (6) via the returning part of the ribbon loop, as is shown by way of example in FIG. 2. A particularly high precision can consequently be achieved during the rolling of the ribbon loop.

For the sake of clarity, ribbon guide rolls which fit the expanding circumference of the workpiece are not shown in FIG. 2. Nevertheless, such rolls having large circumference are expedient, in particular in producing ribbon loops. Normal bearings and supporting systems for ensuring the precisional stability of the roll arrangement and ribbon lubrication systems known from rolling technology are also absent from the figure.

The rolled ribbon loop is optionally subjected to some aftertreatment measures known in the technology. In particular, they may be hardened, tempered and straightened.

In the next step of the method for producing the seamless ribbon and wire loops according to the invention, the rolled ribbon loop is brought to an identical width over its entire circumference and optionally divided. For this purpose, it is preferably drawn onto a set of rolls, advantageously formed from 2 to 3 rolls, tensioned and ground at the edges. The ribbon loop is then divided into narrower loops or into wires, for example by abrasive cutting. Expediently, the ribbon loop circulates round the set of rolls while the rotating saw edge of the cutting tool is fed towards it. For the production of wire loops, multi-blade saws with narrow saw blade spacings are particularly suitable for this purpose. In this way, a large number of high-strength wire loops can be produced from a seamless ribbon loop. The cutting steps needed in this process can be carried out in such a way that a harp of wires is produced having the spacings necessary for the cutting process. In a preferred variant of the method, the rolls of the roll set are provided with guide grooves for receiving the wires. In the splitting up of the ribbon loop, the tensioned wires then slide automatically into said guide grooves.

The ribbon loops are optionally provided with a cutting coating along one edge, so that the cut takes place in the plane of the ribbon. In the case of wire loops, the cutting coating is optionally applied to the external wire circumference. The cut line of the saw wire is therefore perpendicular to that of the saw ribbon. The cutting coating is preferably deposited electrochemically, in which process the ribbon edge or wire side to be coated is immersed in the deposition bath. Particularly advantageously, the coating is carried out with ribbon or wire loops already pulled onto the roll set. Screening the wire regions not to be coated during coating with the diamond coat optionally ensures that the coat is applied only to the cutting side of the wire. The finished sawing tool can then be immediately inserted into the sawing machine together with the roll set without a multiplicity of wire loops having to be individually laid on the rolls of the machine. Worn coats can be renewed and the cutting tools reused. Optionally, the production of the wire loops from the ribbon loop and the coating with the cutting coating can also be carried out with the roll set already situated in the sawing machine.

Obviously, the ribbon loops according to the invention can also be equipped to form sawing ribbons with other cutting edges standard in the technology, such as for example teeth. They too are to be understood as cutting coatings in the context of the invention. In addition, not only is use of the ribbon and wire loops provided with a cutting coating in ribbon and cutting saws envisaged, but also use of the ribbon and wire loops without cutting coating as tools in fusion cutting and lapping methods. Finally, the ribbon loops without cutting coating can also be used as ribbons with high load-carrying capacity for conveyance purposes.

The ribbon and wire loops produced by the method according to the invention are notable for a particularly high strength so that even brittle and hard material, such as for example silicon, can be cut up precisely with a very small sawing gap and, correspondingly small cutting loss. The production method avoids expensive measures and enables simple installation of the sawing tools in, and their removal from, the sawing machine.

I claim:
1. A method for producing seamless wire loops, which comprises the following measures:
   a) preparing a seamless metal ring,
   b) converting the metal ring into a rollable starting ring,
   c) expanding the starting ring by cold rolling to form a thin ribbon loop,
   d) drawing the ribbon loop onto a set of rolls provided with guide grooves,
   e) dividing the ribbon loop into wire loops, said wire loops sliding into said guide grooves.

2. The method as claimed in claim 1, wherein the starting ring is manufactured from the metal ring by turning or grinding.

3. The method as claimed in claim 1, wherein a starting ring having a diameter of 50 mm to 500 mm is manufactured.

4. The method as claimed in claim 1, wherein the starting ring is rolled to form a ribbon loop having a circumference of 1 to 6 m by cold rolling.

5. The method as claimed in claim 1, wherein, a cutting coating is applied along the external circumference of the wire loops.

6. The method as claimed in claim 1, wherein the seamless metal ring is cut from a seamless metal tube.

7. The method as claimed in claim 1 wherein the seamless metal ring is cut out of a metal sheet.

8. The method as claimed in claim 1 wherein the seamless metal ring is produced from drilled cylindrical parent bodies.

* * * * *